United States Patent [19]
Yoneyama

[11] Patent Number: 5,918,507
[45] Date of Patent: Jul. 6, 1999

[54] MICROMANIPULATOR FINE CONTROL APPARATUS

[75] Inventor: Shinji Yoneyama, Tokyo, Japan

[73] Assignee: Narishige Co., Ltd., Tokyo, Japan

[21] Appl. No.: 08/886,145

[22] Filed: Jun. 30, 1997

[30]     Foreign Application Priority Data

Jul. 2, 1996   [JP]   Japan .................................... 8-171931

[51] Int. Cl.⁶ .............................. G02B 21/32; G05D 3/00
[52] U.S. Cl. .................................. 74/490.12; 74/471 XY; 74/479.01; 414/2; 414/4
[58] Field of Search ........................ 74/471 XY, 490.13, 74/490.12, 479.01; 414/2, 4, 1, 7

[56]         References Cited

U.S. PATENT DOCUMENTS

| 4,679,976 | 7/1987 | Narishige et al. | 74/471 XY |
| 4,749,270 | 6/1988 | Endo et al. | 359/392 |
| 4,946,329 | 8/1990 | Krueger | 74/479.01 |

FOREIGN PATENT DOCUMENTS

| 1336242 | of 0000 | France . |
| 1431862 | of 0000 | France . |
| 1230640 | 12/1966 | Germany . |
| 2186706 | 8/1987 | United Kingdom . |
| 2304398 | 3/1997 | United Kingdom . |

*Primary Examiner*—John A. Jeffery
*Assistant Examiner*—William C Joyce
*Attorney, Agent, or Firm*—Pillsbury Madison & Sutro LLP

[57]          ABSTRACT

A micromanipulator fine control apparatus is operated with a mouse. As the mouse is moved to the front, rear, left and right, a control handle is tilted to the front, rear, left and right, respectively, and a fore and aft fine control slider and a left-right fine control slider are moved in the corresponding directions. A liquid amount contained in a first liquid-operated cylinder is varied by a fore and aft fine control liquid-operated arrangement responsive to the fore and aft fine control slider, and a liquid amount of a second liquid-operated cylinder is varied by left-right fine control liquid-operated arrangement responsive to the left-right fine control slider. Accordingly, the micromanipulator is finely moved in the same direction as the mouse is moved.

3 Claims, 8 Drawing Sheets

MICROMANIPULATOR FINE CONTROL APPARATUS

BACKGROUND OF THE INVENTION

1. Field of the Invention

The present invention relates to a micromanipulator fine control apparatus which can remotely control microtools, such as glass electrodes under microscopes, by liquid pressure, such as oil pressure.

2. Description of Related Art

In the field of basic medical science or biotechnology, there are micromanipulators for treating cells in various manners, for example, retaining, suctioning, injecting and dividing organs of creatures, cellular textures and egg cells. The cells are treated in various ways by finely controlling the micromanipulator with microscopes. When an operator finely controls the micromanipulator by directly touching a control handle of the micromanipulator, his hand trembling may be multiplied and transmitted to the micromanipulator through a body frame. Therefore, the micromanipulator needs to be gently operated without hand trembling, which requires complicated operations, the greatest possible care and a lot of skills. In order to solve these problems, there has been known liquid-operated micromanipulators which can finely and remotely control using hydraulic pressure, e.g., oil pressure.

FIG. 1 is a schematic view showing the basic structure of a conventional cell treatment device.

In FIG. 1, the cell treatment device comprises a stage 83 for mounting a Petri dish 82 containing egg cells 81 dipped in a reagent therein, a fixed retaining unit 84 for fixedly retaining the cells 81, a micromanipulator 85 for carrying out the practical cell treatment, and an optical system 86 for observing images of the cells 81 irradiated with light. The cell treatment device is mounted on a vibration-proof mat 87.

The micromanipulator 85 is provided with various kinds of microtools 88, such as glass electrodes, corresponding to the type of cell treatment, and a three dimensional displacement mechanism for moving a tip of the microtool 88 in three dimensions. The three dimensional displacement mechanism is finely operated, e.g., with hydraulic pressure through a joystick 89 which is controlled by an operator.

The joystick 89 comprises a control handle 92 vertically suspended from the distal end of a supporting frame 91 having a visor shape and a transmitting unit 94 for transmitting oscillation in two directions 93 (shown by arrows in FIG. 1) of the control handle 92. The joystick 89 is for finely controlling the two dimensional movement of the micromanipulator 85 by manipulating the control handle 92.

The control handle 92 has a converting unit 95 for converting the oscillation motion in two directions (indicated by arrows) 93 crossing at a right angle into a mechanical displacement in a horizontal plane.

In conventional devices, other than one with the suspended control handle, there is a device with the control handle vertically standing from the converting part 95. However, recently devices with a suspended control handle are widely used because the operators can operate the device at a lower position without raising their arms.

Further, there is a known device having a mechanism for finely controlling the vertical movement of an object to be treated in order to meet the requirement of vertical movement of an object to be treated in a three dimensional displacement mechanism.

In the system that the three dimensional displacement mechanism of the micromanipulator is actuated with hydraulic pressure such as oil pressure through the fine-control joystick, the operator tilts and moves the control handle of the joystick in the desired angle and direction to move the tip of the microtool mounted on the micromanipulator to the desired position while looking it through the microscope. Even when the operator only intends to horizontally move the microtool of the micromanipulator, the actual operation is to tilt the control handle of the joystick, which makes the operation difficult.

Furthermore, after the operator has moved the tip of the microtool to the desired position by tilting and moving the control handle of the joystick, when the operator lets go of the control handle, the control handle is moved a little since it is not held. Accordingly, the tip of the microtool is moved a little from the desired position.

BRIEF SUMMARY OF THE INVENTION

Today is the computer age. Mouses are widely used as input devices for indicating the position on a screen of a display, e.g., a CRT display of a computer. Accordingly, in this computer age, as the input devices, mouses are demanded for remotely controlling a micromanipulator, not a joystick.

Therefore, it is an object of the present invention to provide a micromanipulator fine control apparatus which solves the above-stated problems, which uses horizontally movable operating means, a mouse, and which does not cause position displacement of the tip of the microtool when the operator lets go of the operating means.

In order to achieve the above object, a micromanipulator fine control apparatus of the present invention comprises 1) a first moving unit for sliding in the fore and aft directions and having a vertical through hole, 2) an adjusting member having a screw part to be inserted into the through hole of the first moving unit, and a fixed ball suspended from the screw part, 3) a second moving unit for sliding in the left and right directions and having a vertical through hole, 4) a movable ball rotatably supported by the through hole of the second moving unit, a suspended control handle and a cylindrical inner surface which is in contact with an outer surface of the fixed ball, 5) a flat base plate, 6) a supporting stand which stands on the base plate, which has an extending horizontal portion at a predetermined height, and which slidably supports the first moving unit and the second moving unit in respective directions, 7) a supporting ball having a through hole for supporting the lower end of the control handle inserted into the through hole of the supporting ball, 8) a horizontal movement operating means which includes a hollow, and a through hole at the top of the hollow, and which is slidably provided on the base plate above the upper surface of the control handle, and which rotatably supports the supporting ball at the through hole at the top of the hollow, 9) a fore and aft fine control liquid-operated means which is provided between the supporting stand and the first moving unit, which has a first liquid-operated cylinder coupled to a fore and aft fine control liquid-operated cylinder of the micromanipulator with a first hose and having a first piston movably fitted to the first liquid-operated cylinder, and which varies the amount of liquid of the first liquid-operated cylinder by moving the first moving unit, and 10) a left-right fine control liquid-operated means which is provided between the supporting stand and the second moving unit, and which has a second liquid-operated cylinder coupled to a left-right fine control liquid-operated cylinder of the micromanipulator with a second hose and having a second piston movably fitted to the second liquid-operated cylinder, and which varies the amount of liquid of the second liquid-operated cylinder by moving the second moving unit.

When the horizontal movement operating means is moved to the front, rear, left and right, the control handle is tilted to the front, rear, left and right, respectively, and the first moving unit and the second moving unit are moved. Then, the amount of liquid in the first liquid-operated cylinder is varied by the fore and aft fine control liquid-operated means, and the amount of liquid in the second liquid-operated cylinder is varied by the left right fine control liquid-operated means. As a result, the micromanipulator is finely moved in the same direction as the moving direction of the horizontal movement operating means.

The fore and aft fine control liquid-operated means may comprise a first bearing metal fixed to one of the supporting stand and the first moving unit, a first fine control screw shaft screwed into the first bearing metal, and a fore and aft fine control handle fixed to an end of the first fine control screw shaft, and the first piston of the fore and aft fine control liquid-operated means is fixed at the end of the first fine control screw shaft. The first piston slides in the first liquid-operated cylinder by rotating the fore and aft fine control handle. The left-right fine control liquid-operated mean may comprise a second bearing metal fixed to one of the supporting stand and the second moving unit, a second fine control screw shaft screwed into the second bearing metal, and a left right fine control handle fixed to an end of the second fine control screw shaft. The second piston of the left-right fine control liquid-operated means is fixed at the end of the second fine control screw shaft. The second piston slides in the second liquid-operated cylinder by rotating the left right fine control handle.

Further, the horizontal movement operating means comprises vertical fine control liquid-operated means for the vertical movement of the micromanipulator, and the vertical fine control liquid-operated means comprises a third liquid-operated cylinder coupled to a vertical fine control liquid-operated cylinder of the micromanipulator with a third hose, a third bearing metal, a third fine control screw shaft which is screwed into the third bearing metal, a vertical fine control handle fixed to an end of the third fine control screw shaft, and a third piston movably fitted to the third liquid-operated cylinder and fixed to the end of the third fine control screw shaft. The third piston slides in the third liquid-operated cylinder by rotating the vertical fine control handle.

With the micromanipulator fine control apparatus of the present invention according to the above-described structure, when the operator holds and moves the horizontal movement operating means, viz., a mouse, to the front, rear, left and right while looking through the microscope, the micromanipulator is finely moved in the same directions as the horizontal movement operating means, so that the micromanipulator can be finely moved to the direction that the operator moves the mouse. Accordingly, the micromanipulator can readily be operated and the operability can be improved.

Moreover, when the operator lets go of the horizontal movement operating means, since the control handle is held by the horizontal movement operating means, the microtool placed on the micromanipulator is not moved. Furthermore, the horizontal movement operating means is a mouse, so that an operator can readily hold and operate it.

The mechanism of the micromanipulator fine control apparatus of the present invention that constitutes the horizontal movement operating means is added to a conventional micromanipulator fine control apparatus having a suspended control handle, so that the structure is very simple. This lowers the manufacturing cost, and the reliability is high.

PREFERRED EMBODIMENTS OF THE INVENTION

The preferred embodiments of a fine control apparatus for a micromanipulator of the present invention will be described with reference to the accompanying drawings.

Figure 1:
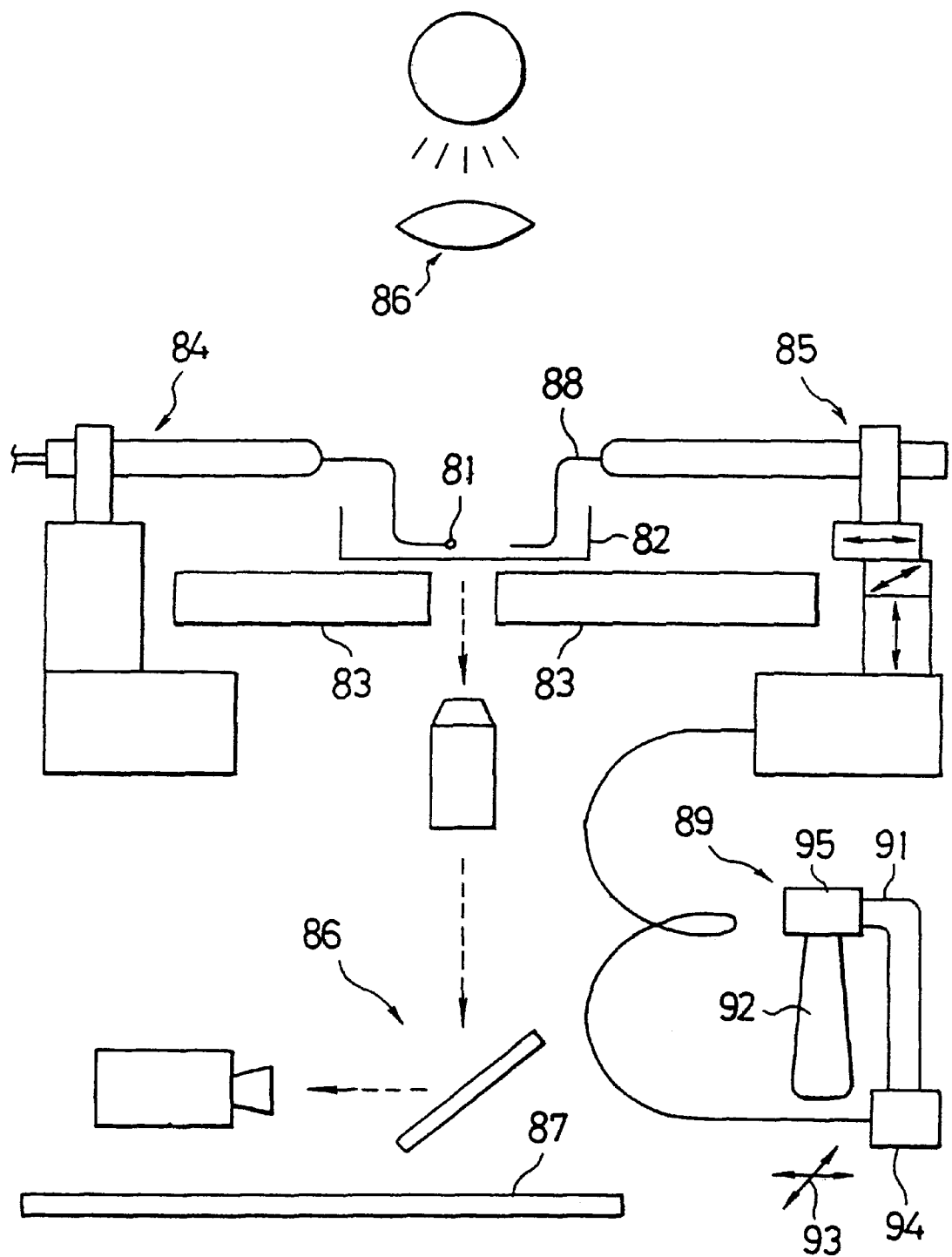
FIG. 1 is a schematic view showing the basic structure of a conventional cell treatment device.
Figure 2:
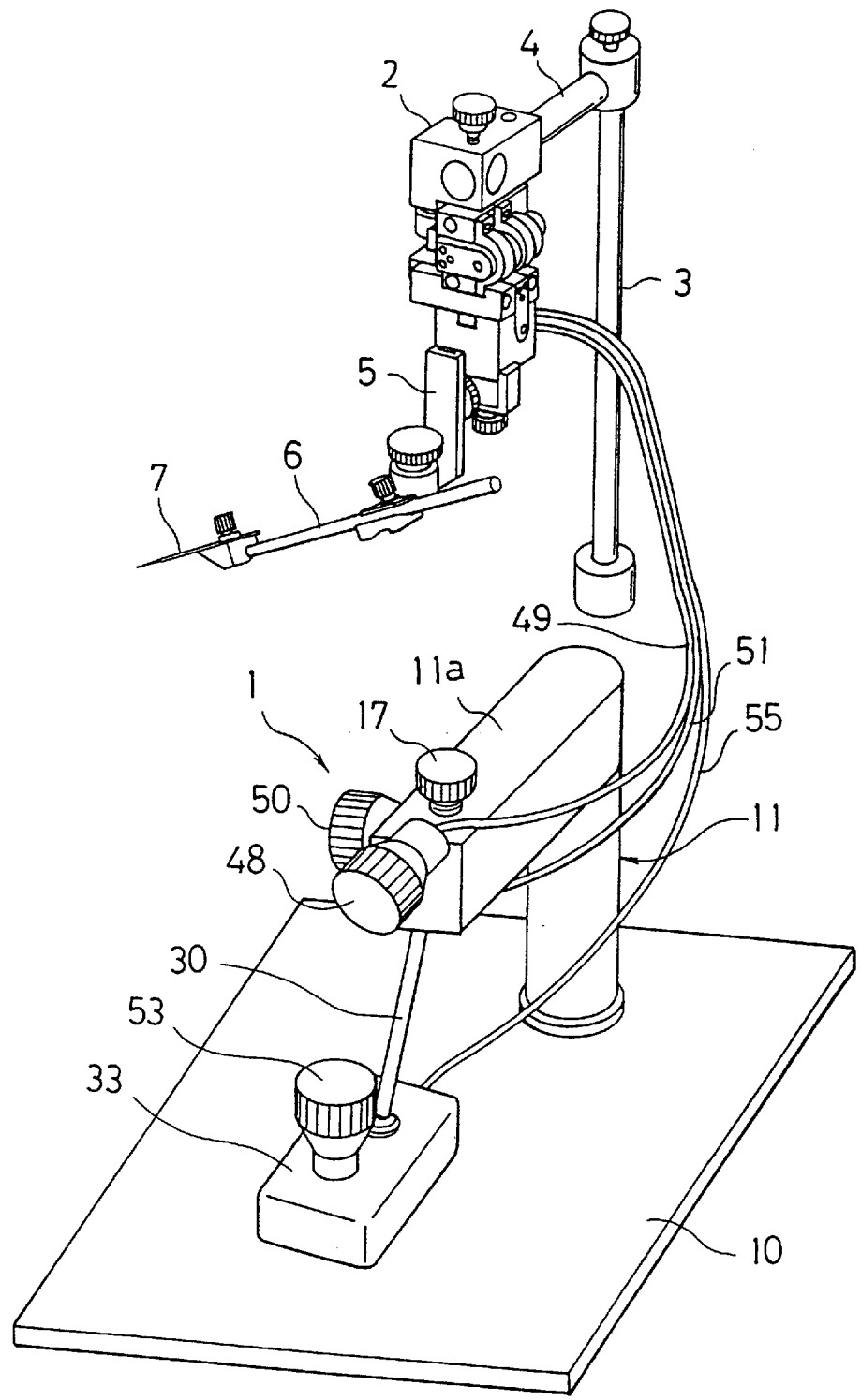
FIG. 2 is a perspective view showing a micromanipulator fine control apparatus according to the present invention installed in a micromanipulator.

FIG. 2 is a perspective view showing a micromanipulator fine control apparatus of the present invention mounted on a three dimensional, liquid-operated micromanipulator. As shown in FIG. 2, the micromanipulator fine control apparatus 1 is connected to a three dimensional, liquid-operated micromanipulator 2 (hereinafter called micromanipulator) through hoses 49, 51, 55 which will be described later, and the micromanipulator 2 is fixed at a mounting bar 4 supported by a pole 3. Further, the micromanipulator 2 holds a tightening device 5 and a glass electrode 7 with a holder 6.

The micromanipulator fine control apparatus 1 comprises a base plate 10 and a reverse L-shaped supporting stand 11 provided on the rear portion of the upper surface of the base plate 10. There is a fore and aft fine control slider 13 slidably fitted in a concave groove (not shown) extending a lengthwise direction of a horizontal portion 11a extending towards the front from the top of the supporting stand 11 (see FIG. 3).

Figure 3:
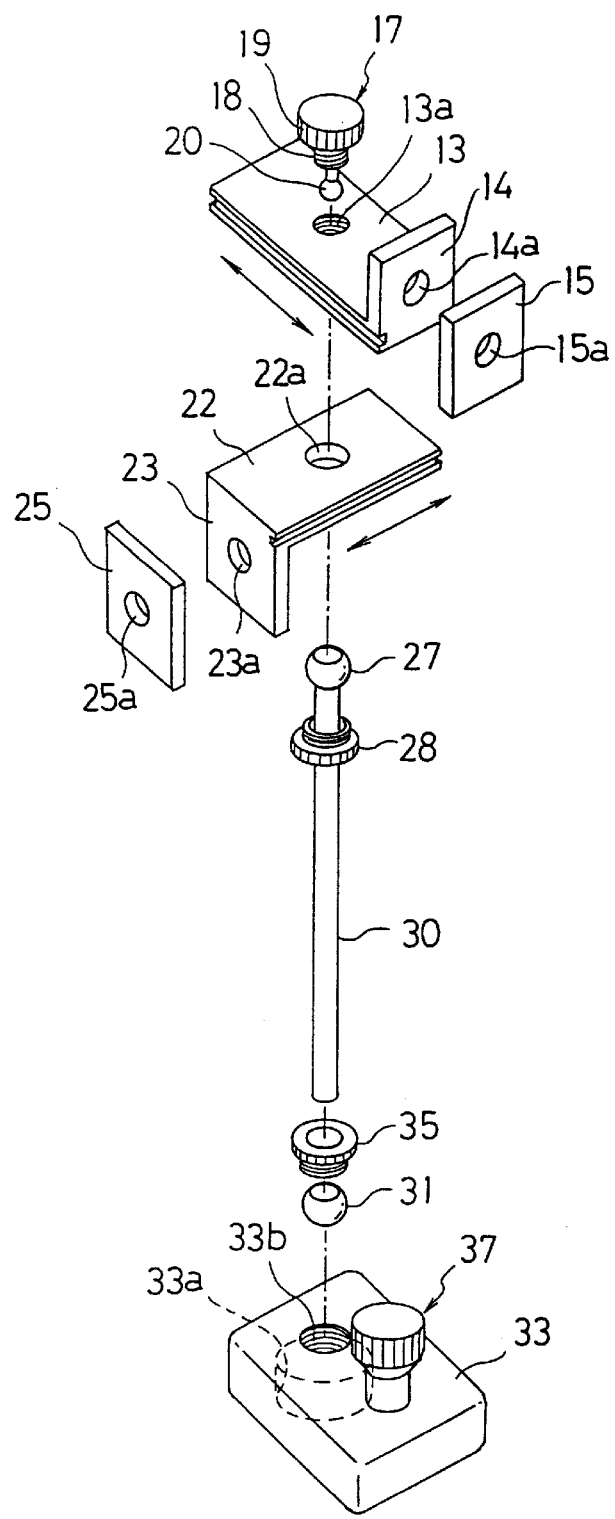
FIG. 3 is an exploded perspective view showing the mechanism of a micromanipulator fine control apparatus according to the present invention.
Figure 4:
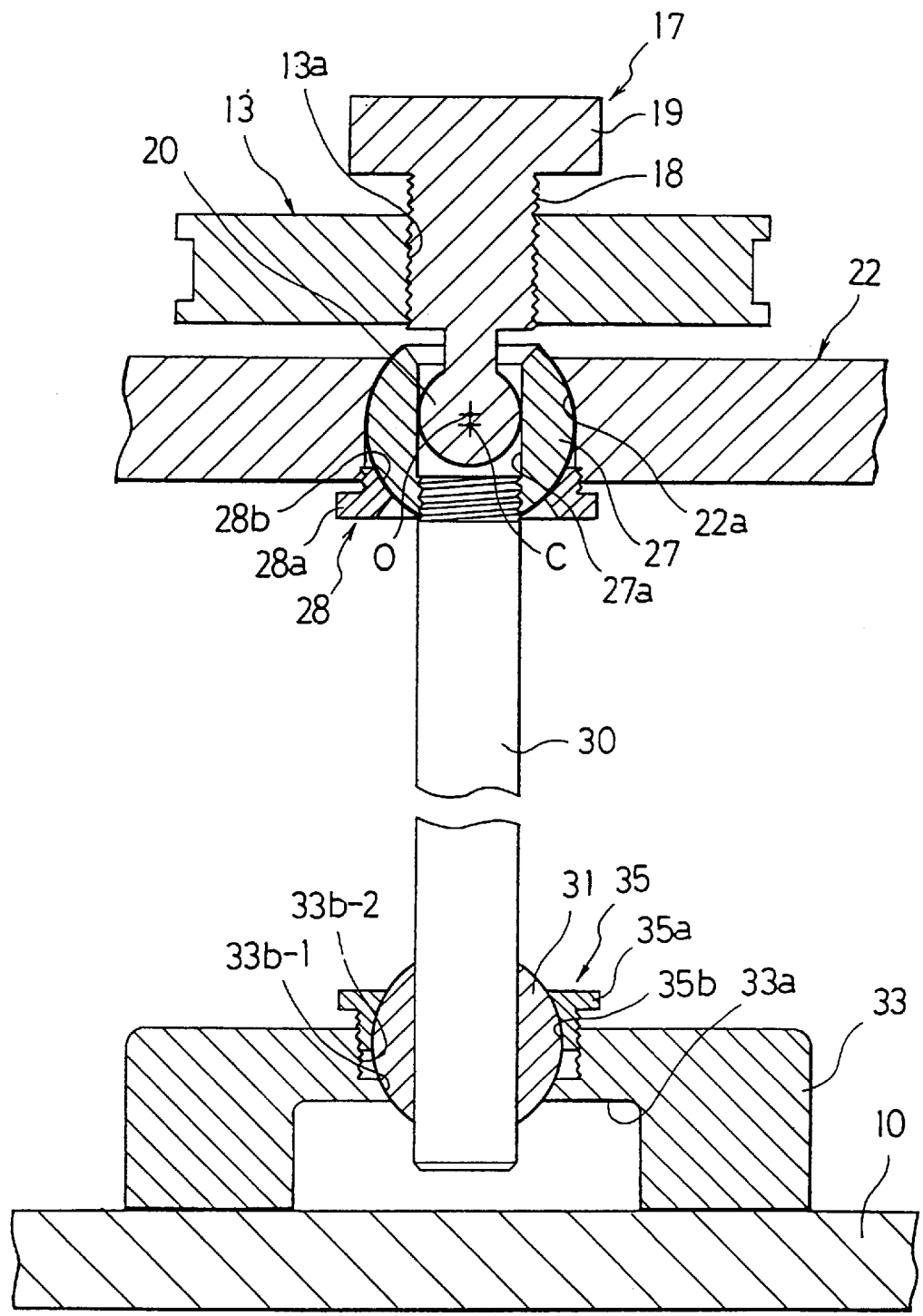
FIG. 4 is a front sectional view showing a mouse portion of a micromanipulator fine control apparatus according to the present invention.

FIG. 3 is an exploded perspective view showing the mechanism of the micromanipulator fine control apparatus and FIG. 4 is a front sectional view showing a mouse of the micromanipulator fine control apparatus 1. As shown in FIGS. 3 and 4, the fore and aft fine control slider 13 includes a cylinder supporting plate 14 extending upwardly and having a through hole 14a. The fore and aft fine control slider 13 is integrated with the cylinder supporting plate 14 and is slidable in the fore and aft directions.

There is arranged a handle supporting plate 15 having a through hole 15a fixedly provided at the supporting stand 11 and facing the cylinder support plate 14. The through hole 15a of the handle support plate 15 and the through hole 14a of the cylinder support plate 14 are placed at substantially the same height.

Further, a female screw 13a is formed at the central portion of the fore and aft fine control slider 13 and an adjusting member 17 for adjusting a fine-control rate is screwed into the female screw 13a. The adjusting member 17 comprises a screw portion 18 screwed into the female screw 13a of the fore and aft fine control slider 13, a grasp portion 19, having a knurl integrally formed on circumference of the screw portion 18, for rotating the adjusting member 17, and a fixed ball 20 suspended under the screw portion 18. The adjusting member 17 can be moved vertically by holding and rotating the grasp portion 19.

There is provided a downward concave groove extending to the left and right under the concave groove of the fore and aft fine control slider 13 of the horizontal portion 11a of the supporting stand 11.

A left-right fine control slider 22 is fitted into the downward concave groove so as to be slidable to the left and right.

Further, a cylinder support plate 23 having a through hole 23a is suspended downwardly at a left end of the left-right fine control slider 22. The left-right fine control slider 22 is combined with the cylinder support plate 23 so as to be slidable in the left and right directions.

There is arranged a handle supporting plate 25 having a through hole 25a fixedly provided at the supporting stand 11 and facing the cylinder support plate 23. The through hole 25a of the hand support plate 25 and the through hole 23a of the cylinder support plate 23 are placed at substantially the same height.

Further, there is provided a through hole 22a having a large diameter, substantially at the center of the left-right fine control slider 22, which has a female screw at a lower portion and which is tapered so as to have a smaller diameter at an upper portion and which has a curved surface so as to support an upper portion of a movable ball 27 to prevent the movable ball 27 from moving from the upper portion.

A movable ball fixture 28 supporting a lower portion of the movable ball 27 is screwed into the female screw of the through hole 22a of the left-right fine control slider 22 from the lower portion thereof. The movable ball fixture 28 is substantially cylindrical and has a lock portion 28a at the lower part and a curved surface 28b at the upper part to prevent the movable ball 27 from moving downward.

The movable ball 27 has a cylindrical hole 27a, and the outer surface of the fixed ball 20 suspended from the fore and aft fine control slider 13 is in contact with the cylindrical hole 27a (cylindrical inner surface). The upper portion of a control handle 30 is screwed into the lower portion of the cylindrical hole 27a of the movable ball 27.

Further, the lower part of the control handle 30 is inserted into a cylindrical through hole of a supporting ball 31 so as to be slidable.

A mouse 33 which is horizontal control means, is slidable on the base plate 10. The mouse 33 is a rectangular parallelepiped and has a cylindrical hollow 33a with a lower surface open. The mouse 33 has a curved surface 33b-1 for supporting the lower portion of the supporting ball 31 and preventing the supporting ball 31 from removing downward at the center of the rear portion of the upper surface, a female screw 33b-2 formed at the upper portion, and a through hole 33b communicating with the center of the hollow 33a.

A supporting ball fixture 35 for supporting the upper portion of the supporting ball 31 is screwed into the female screw 33b-2. The supporting ball fixture 35 is substantially cylindrical and has a lock portion 35a at the upper portion and a curved surface 35b for supporting the upper portion of the supporting ball 31 on the inner surface of the cylinder so as to prevent the supporting ball 31 from moving upward.

Accordingly, as the mouse 33 is moved in the fore and aft and left and right directions, the control handle 30 is tilted in the fore and aft and left and right directions, respectively.

Further, the mouse 33 has a vertical fine control operation mechanism 37 at the front portion (see FIG. 3).

Referring to FIG. 4, with the center of the fixed ball 20 being 0 and the center of the movable ball 27 (central point of the tilting motion of the control handle 30) being C, if the center 0 and the center C are matched, the movable ball 27 is rotated around the center 0. There is no fluctuation of physical relationship among the fixed ball 20, the movable ball 27, and the fore and aft fine control slider 13 and the left right fine control slider 22.

However, if the center 0 and the center C are unmatched, for example, when the control handle 30 is tilted in the left and right directions, the movable ball 27 together with the control handle 30 are rotated around the center 0 since the fixed ball 20 is fixed in the left and right directions. Accordingly, the left-right fine control slider 22 is pushed back and smoothly moved in a rotating direction around the center 0.

On the other hand, when the control handle 30 is tilted in the fore and aft directions, the fixed ball 20 is rotated around the center C since the fixed ball 20 is movable in the fore and aft directions. Accordingly, the fore and aft fine control slider 13 is pushed back and smoothly moved in a rotating direction around the center C.

Further, a control mechanism for a fine control ratio is achieved to control the fine control ratio by changing the amount the adjusting member 17 is screwed into the fore and aft fine control slider 13 so as to vertically move the fixed ball 20 along the cylindrical hole 27a of the movable ball 27 to vary the central distance between the fixed ball 20 and the movable ball 27.

Next, a fore and aft fine control operation mechanism 38 provided at the handle support plate 15 and the cylinder support plate 14 will be explained.

Figure 5:
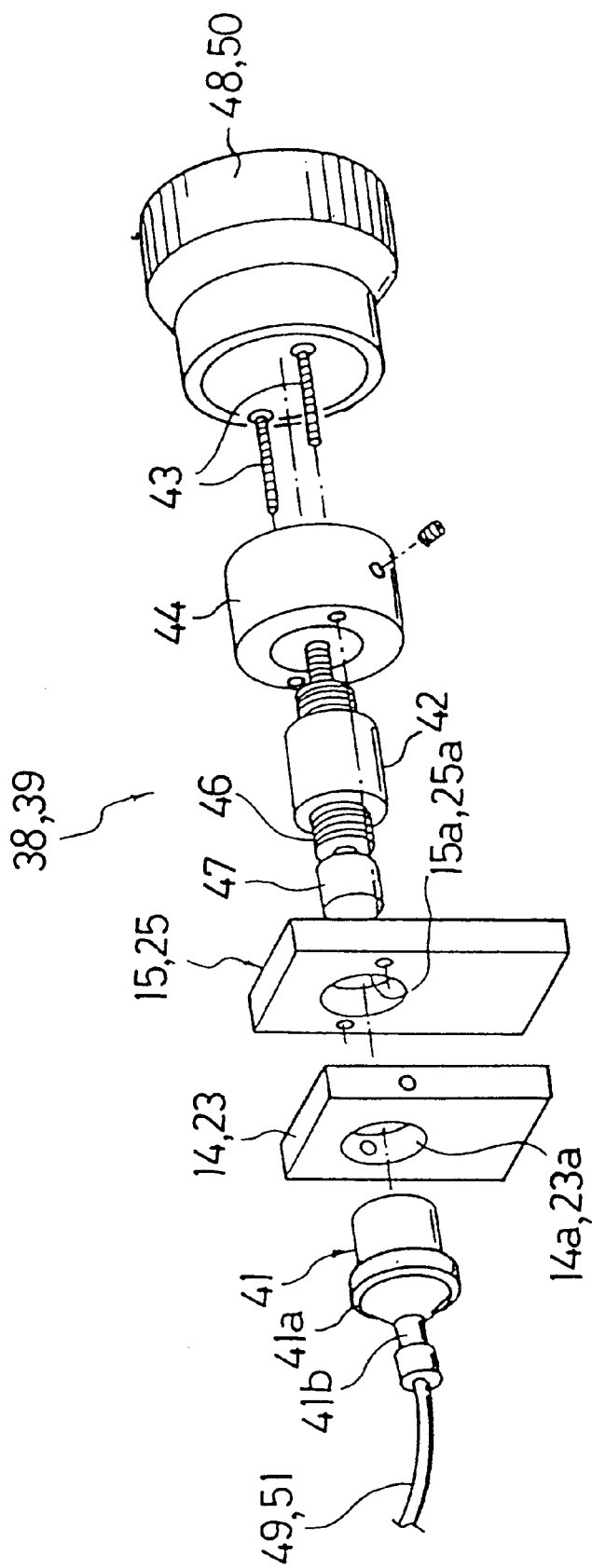
FIG. 5 is an exploded perspective view showing a fore and aft fine control operation mechanism and a left-right fine control operation mechanism.

FIG. 5 is an exploded perspective view of the fore and aft fine control operation mechanism 38 and the left right fine control operation mechanism 39. As shown in FIG. 5, a hydraulic cylinder 41 is fitted into the circular through hole 14a of the cylinder support plate 14 placed at the front end of the fore and aft fine control slider 13, and a lock portion 41a of the hydraulic cylinder 41 is in contact with the edge of the through hole 14a. The hydraulic cylinder 41 has a cylindrical shape having one open end and comprises the lock portion 41a at its outer surface and a hose fixture 41b at the closed end. A piston 47 which will be described later is slidably fitted into the hydraulic cylinder 41, and an oil reservoir is formed between the hydraulic cylinder 41 and the piston 47.

The fore and aft fine control slider 13 together with the cylinder support plate 14 and the hydraulic cylinder 41 are movable in the fore and aft directions.

Further, a distal end of a metal bearing 42 is fitted into the through hole 15a of the handle support plate 15 fixed to the supporting stand 11. The bearing 42 is further fitted into the central hole of a metal bearing setting 44 fixed at the handle support plate 15 by bolts 43. A female screw thread is formed in a through hole of the bearing 42, and a male screw thread of a fine control screw shaft 46 is screwed into the female screw thread. A cylindrical piston 47 is fixed at the end of the fine control screw shaft 46. The piston 47 can freely pass through the through hole 15a of the handle support plate 15 and be slidable in the hydraulic cylinder 41.

The end of the fine control screw shaft 46 is rotatably fitted into the bearing setting 44 which is fixed to a fore and aft fine control handle 48 having an open end and knurling formed on the outer surface at the closed end.

When the fore and aft fine control handle 48 is rotated, the fine control screw shaft 46 is rotated and moved in the fore and aft directions since the male screw of the fine control screw shaft 46 is screwed into the female screw thread of the bearing 42. The 47 therefore slides in the hydraulic cylinder 41.

One end of the hose 49 is connected to the hose fixture 41b communicating with the oil reservoir of the hydraulic cylinder 41 through a small hole, and the other end of the hose 49 is connected to a Y-axis hydraulic cylinder 63 which will be described later.

A left-right fine control operation mechanism 39 provided at the handle support plate 25 and the cylinder support plate 23 is constituted in the same way as the fore and aft fine control operation mechanism 38. When a left-right fine control handle 50 is rotated, the fine control screw shaft 46 is rotated and is moved to the left and right. The piston 47 is therefore moved to the left and right.

One end of the hose 51 is connected to the hose fixture 41b of the hydraulic cylinder 41, and the other end of the hose 49 is connected to an X-axis hydraulic cylinder 63 which will be described later.

Figure 6:
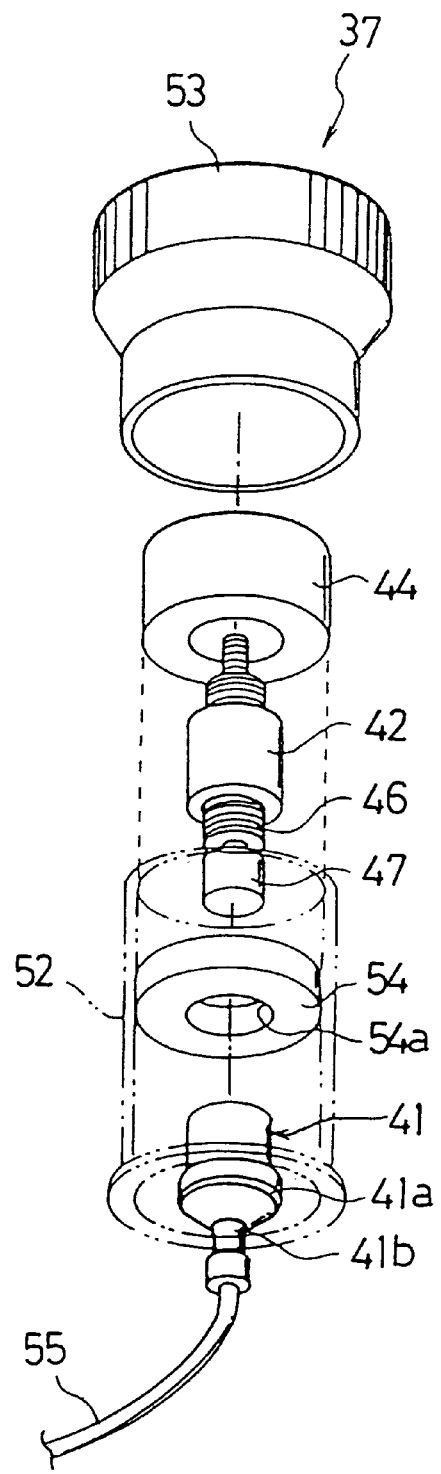
FIG. 6 is an exploded perspective view showing a vertical fine control operation mechanism.

FIG. 6 is an exploded perspective view of the vertical fine control operation mechanism 37. As shown in FIG. 6, a cylindrical case 52 is placed on the front portion of the mouse 33, and the bearing setting 44 is fitted into the upper portion of the cylindrical case 52. The vertical fine control handle 53 having an open end and knurling at the closed end is rotatably attached to the upper outer surface of the cylindrical case 52. The hydraulic cylinder 41 is fitted into the central hole 54a of the cylinder support ring 54 the outer surface of which is fixed in the cylindrical case 52. The hydraulic cylinder 41 is constituted in the same way as the above-described fore and aft fine control operation mechanism 38 except that it has no slide mechanism.

One end of the hose 55 is connected to the hose fixture 41b of the hydraulic cylinder 41 and the other end thereof is connected to a Z-axis hydraulic cylinder 63 which will be described later.

Figure 7:
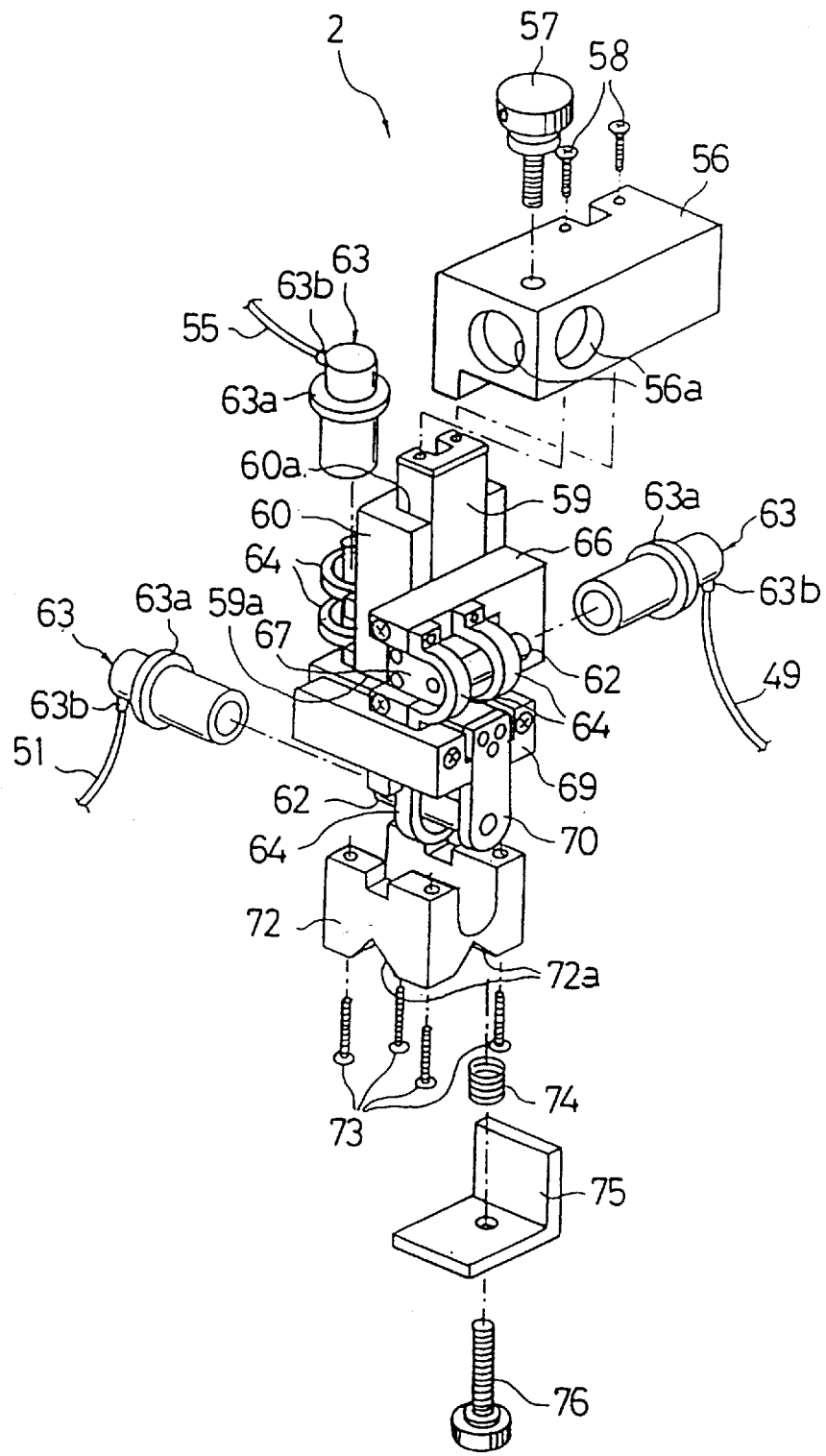
FIG. 7 is an exploded perspective view showing the micromanipulator.

FIG. 7 is an exploded perspective view of the micromanipulator. As shown in FIG. 7, the micromanipulator 2 comprises a fixed stand 56 having holes 56a at the side surfaces to which the mounting bar 4 is inserted. A fixture screw 57 for fastening the mounting bar 4 to fix the fixed stand 56 to the mounting bar 4 is screwed into the upper surface of the fixed stand 56. Additionally, the fixed stand 56 is fixed at the upper end of a vertical Z-axis inner slider 59 with bolts 58. The Z-axis inner slider 59 is movably placed in the Z-direction in a concave groove 60a formed in a Z-axis outer slider 60 in the vertical direction through a linear way bearing (not shown). A spring (not shown) is placed in a small groove formed in the Z-axis inner slider 59 in the Z direction, and one end of the spring is fixed to the Z-axis inner slider 59 and the other end thereof is fixed to the Z-axis outer slider 60 so that the Z-axis slider 60 is always pressed upwards.

A piston fixing plate 59a is horizontally provided at the lower end of the Z-axis inner slider 59 so as to extend to the opposite end of the concave groove 60a of the Z-axis outer slider 60, and a piston 62 is provided so as to be positioned at the piston fixing plate 59a.

A hydraulic cylinder 63 is fixed at the surface of the Z-axis outer slider 60 opposite to the concave groove 60a by cylinder fasteners 64 which are provided in parallel at a predetermined interval so that an opening of the hydraulic cylinder 63 faces the piston 62. The hydraulic cylinder 63 has a cylindrical shape with one open end and comprises a lock portion 63a at its outer surface and a hose connection opening 63b at its closed end. The lock portion 63a is in contact with the inner side surface of a cylinder fastener 64, and one end of the hose 55 is connected to the hose connection opening 63b.

The piston 62 is slidably fitted into the hydraulic cylinder 63, and an oil reservoir is formed between the hydraulic cylinder 63 and the piston 62. The shape and size of the oil reservoir of the hydraulic cylinder 63 are the same as those of the oil reservoir of the hydraulic cylinder 41 of the micromanipulator fine control apparatus 1, and the same amount of oil is contained therein.

A Y-axis outer slider 66 and a Y-axis inner slider 67 which slide in the fore and aft directions and an X-axis outer slider 69 and an X-axis inner slider 70 which slide in the left and right directions are constituted in the same way as the above-described Z-axis outer slider 60 and the Z-axis inner slider 59 which slide in the vertical directions. One end of the hose 49 is connected to the hose connection opening 63b of the hydraulic cylinder 63 fixed at the Y-axis outer slider 66, and one end of the hose 51 is connected to the hose connection opening 63b fixed at the X-axis outer slider 69.

The Y-axis slider 67 is fixed at the Z-axis outer slider 60, and the X-axis inner slider 70 is fixed at the Y-axis outer slider 66.

A tightening fixture stand 72 is fixed at the lower surface of the X-axis outer slider 69 by bolts 73, and V-shaped grooves 72a are formed at the lower surface of the tightening fixture stand 72 so as to be perpendicular to each other and facing downward. The tightening device 5 is inserted into the V-shaped groove 72a and fixed at the tightening fixture stand 72 with a spring 74, an L-shaped presser 75 and a tightening bolt 76.

Figure 8:
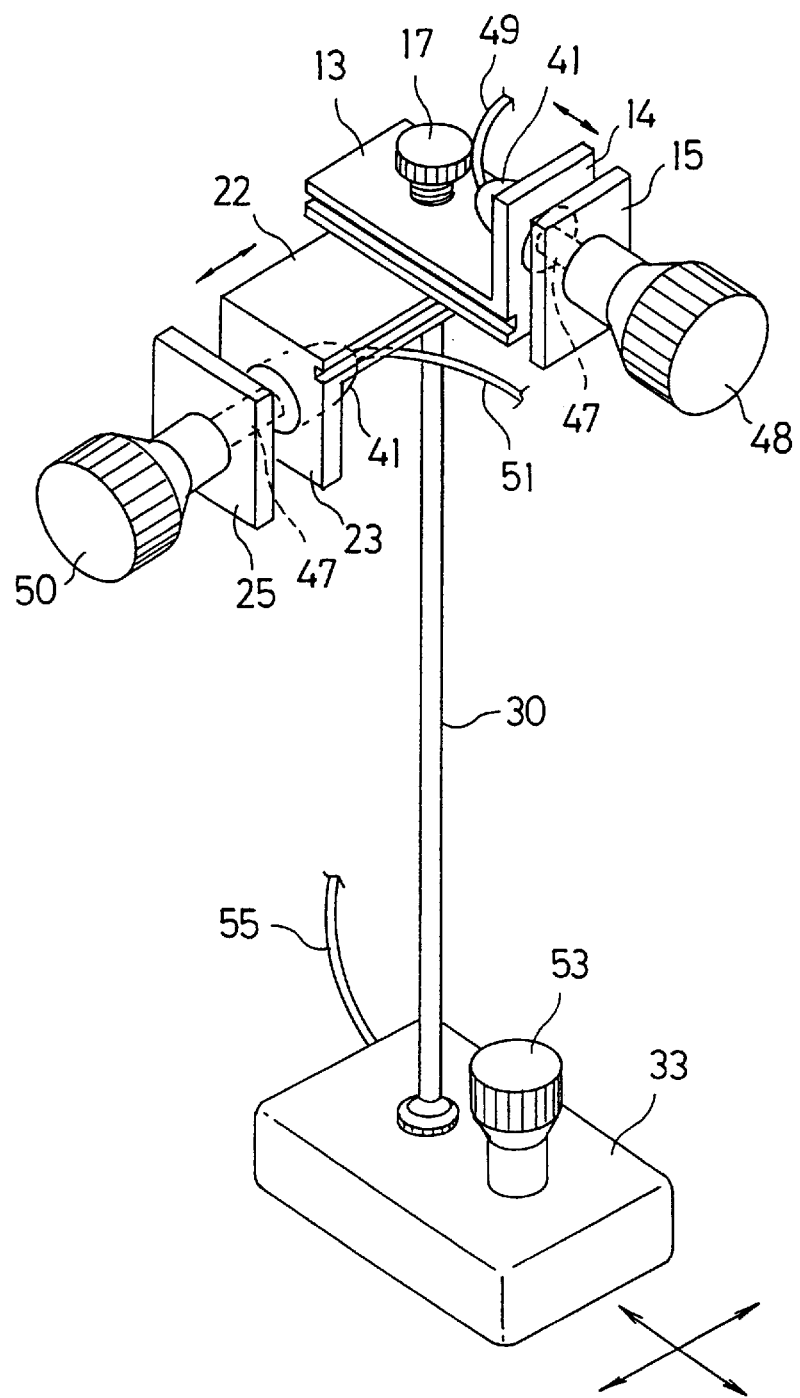
FIG. 8 is a perspective view showing the operation of the micromanipulator fine control apparatus according to the present invention.

The operation of the micromanipulator fine control apparatus now will be described with referene to FIG. 4 and FIG. 8. FIG. 8 is a perspective showing the operation of the micromanipulator fine control apparatus.

First, when the operator holds the mouse 33 and moves it to the front, the control handle 30 is tilted to the front and the movable ball 27 is rotated to the front. Then, the fixed ball 20 is rotated about the center C of the movable ball 27, and the fore and aft fine control slider 13 is finely moved backward. The cylinder support plate 14 and the hydraulic cylinder 41 are also moved backwards. Accordingly, the oil reservoir formed between the hydraulic cylinder 41 and the piston 47 widens, so that the forced oil immediately flows into the hydraulic cylinder 41 from the Y-axis hydraulic cylinder 63 through the hose 49 by the act of the spring extended between the Y-axis outer slider 66 and the Y-axis inner slider 67 of the micromanipulator 2.

The oil reservoir between the Y-axis hydraulic cylinder 63 and the piston 62 thereby is narrowed, so that the Y-axis outer slider 66 is finely moved to the front and the tightening fixture stand 72 is also finely moved to the front.

On the other hand, when the operator holds and moves the mouse 33 to the rear, the control handle 30 is tilted to the rear and the movable ball 27 is rotated to the rear. Then, the fixed ball 20 is rotated about the center C of the movable ball 27, and the fore and aft fine control slider 13 is slightly moved to the front. The cylinder support plate 14 and the hydraulic cylinder 41 are also moved to the front. Accordingly, the oil reservoir formed between the hydraulic cylinder 41 and the piston 47 is narrowed, so that the forced oil immediately flows into the Y-axis hydraulic cylinder 63 of the micromanipulator 2 from the hydraulic cylinder 41 through the hose 49.

The oil reservoir between the Y-axis hydraulic cylinder 63 and the piston 62 thereby widens, so that the Y-axis outer slider 66 is finely moved to the rear and the tightening fixture stand 72 is also finely moved to the rear.

When the operator holds and moves the mouse 33 to the right, the control handle 30 is tilted to the right and the movable ball 27 is rotated about the center 0 of the fixed ball 20. The left right fine control slider 22 thereby is moved to the right, and the cylinder support plate 23 and the hydraulic cylinder 41 are also moved to the right. Accordingly, the oil reservoir formed between the hydraulic cylinder 41 and the piston 47 widens, so that the forced oil immediately flows into the hydraulic cylinder 41 from the X-axis hydraulic cylinder 63 through the hose 51 by the spring extended between the X-axis outer slider 69 and the X-axis inner slider 70 of the micromanipulator 2.

The oil reservoir between the X-axis hydraulic cylinder 63 and the piston 62 thereby is narrowed, so that the X-axis outer slider 69 is moved to the right and the tightening fixture stand 72 is also moved to the right.

On the other hand, when the operator holds and moves the mouse 33 to the left, the control handle 30 is tilted to the left, and the movable ball 27 is rotated about the center 0 of the fixed ball 20. The left right fine control slider 22 thereby is finely moved to the left, and the cylinder support plate 23 and the cylinder 41 are also finely moved to the left. Accordingly, the oil reservoir formed between the hydraulic cylinder 41 and the piston 47 is narrowed, so that the forced oil immediately flows into the X-axis hydraulic cylinder 63 of the micromanipulator 2 from the hydraulic cylinder 41 through the hose 51.

The oil reservoir between the X-axis hydraulic cylinder 63 and the piston 62 thereby widens, so that the X-axis outer slider 69 is finely moved to the left and the tightening fixture stand 72 is a 1 so moved to the left.

Therefore, while the operator holds and moves the mouse 33 to the front, rear, left and right by looking through the microscope, the tip of the glass electrode 7 held by the micromanipulator 2 can finely be moved in the same discretion as the mouse 33. Accordingly, the tip of the glass electrode 7 can finely be moved in the directions the operator moves it.

Further, as shown in FIG. 5, when the operator rotates the fore and aft fine control handle 48, the fine control screw shaft 46 is rotated, and the fine control screw shaft 46 and the piston 47 are moved in the hydraulic cylinder 41 forward and backward. Then, the amount of oil in the oil reservoir of the hydraulic cylinder 41 is varied, and the amount of oil in the oil reservoir of the Y-axis hydraulic cylinder 63 o f the micromanipulator 2 connected to the hydraulic cylinder 41 through the hose 49 is also varied. The Y-axis outer slider 66 and the tightening fixture stand 72 thereby are finely moved forwards and backwards.

When the operator rotates the left-right fine control handle 50, the fine control screw shaft 46 is rotated, and the fine control screw shaft 46 and the piston 47 are moved in the left and right directions in the hydraulic cylinder 41. Then, the amount of oil in the oil reservoir of the hydraulic cylinder 41 is varied, and the amount of oil in the oil reservoir of the X-axis hydraulic cylinder 63 of the micromanipulator 2 connected to the hydraulic cylinder 41 through the hose 51. The X-axis outer slider and the tightening fixture stand 72 thereby are finely moved in the left and right directions.

Further, as shown in FIG. 6, when the operator rotates the vertical fine control handle 53 provided at the front portion of the mouse 33, the fine control screw shaft 46 is rotated, and the fine control screw shaft 46 and the piston 47 are vertically moved in the hydraulic cylinder 41. Accordingly, the amount of oil in the oil reservoir of the hydraulic cylinder 41 is varied and the amount of oil in the oil reservoir of the Z-axis hydraulic cylinder 63 of the micromanipulator 2 connected to the hydraulic cylinder 41 through the hose 55 is also varied. The Z-axis slider 60 and the tightening fixture stand 72 thereby are finely moved upwards and downwards.

It should be noted that in the above-described embodiments, the hydraulic cylinders are utilized in the micromanipulator fine control apparatus and the micromanipulator, but other liquid-operated cylinders, e.g., water-operated cylinders can be used.

Further, in the above-described embodiments, the hydraulic cylinder of the micromanipulator fine control apparatus and the hydraulic cylinder of the micromanipulator is formed in a one to one ratio, but they can be used in a ratio of 1 to 5 or other ratios.

Furthermore, the vertical fine control mechanism is located at the front portion of the mouse but the vertical fine control mechanism can be located at any position of the upper surface of the mouse, and moreover, it can be located on the base plate separate from the mouse.

In the above embodiments, the hydraulic cylinder 41 is provided at the fore and aft fine control slider 13 and the left right fine control slider 22, and the piston 47 is provided at the support stand 11; however, the piston 47 can be provided at the fore and aft fine control slider 13 and the left and right fine control slider 22, and the hydraulic cylinder 41 can be provided at the support stand 11.

While the invention has been shown and described with reference to the illustrated embodiments, it should be understood that various changes in form and details may be made without departing from the scope of the invention which is defined in the appended claims.

What is claimed is:

1. A micromanipulator fine control apparatus comprising a flat base plate:

a first movable member slidable in fore and aft directions with respect to the flat base plate, said first member having a threaded vertical through hole;

an adjusting member having a threaded section engaging said threaded vertical through hole of said first movable member, a fixed ball being suspended from said threaded section;

a second movable member slidable in left and right directions with respect to the flat base plate, said second member having a vertical through hole;

a movable ball rotatably supported within said through hole of said second movable member, said movable ball having a control handle vertically suspended therefrom and having a cylindrical inner surface, said cylindrical inner surface being in contact with an outer surface of said fixed ball;

a supporting stand joined to said base plate, said stand having a horizontally extending portion at a predetermined height, above said base plate, said supporting stand slidably supporting said first and second movable members;

a supporting ball having a through hole for supporting a lower end of said control handle inserted into said through hole;

a horizontal movement operating means having a hollow provide with a through hole formed within said hollow, said horizontal movement operating means being horizontally slidable above an upper surface of said base plate, said horizontal movement operating means rotatably supporting said supporting ball within said through hole in said hollow;

a fore and aft liquid-operated fine control means provided between said supporting stand and said first movable member, said fore and aft fine control means having a first liquid-operated cylinder coupled to a fore and aft liquid-operated fine control cylinder of said micromanipulator by a first hose, and a first piston movably fitted within said first liquid-operated cylinder, said fore and aft liquid-operated fine control means varying the amount of liquid within said first liquid-operated cylinder in response to movement of said first movable member; and a left and right liquid-operated fine control means provided between said supporting stand and said second movable member, said left and right fine control means having a second liquid-operated cylinder coupled to a left and right liquid-operated fine control cylinder of said micromanipulator by a second hose, and a second piston movably fitted within said second liquid-operated cylinder, said left and right liquid-operated fine control means varying the amount of liquid within said second liquid-operated cylinder in response to movement of said second movable member; and wherein:

when said horizontal movement operating means is moved fore, aft, left and right, said control handle is tilted fore, aft, left and right, respectively, to correspondingly move said first movable member and said second movable member; said micromanipulator being finely moved in the same direction as the movable direction of said horizontal movement operating means.

2. A micromanipulator fine control apparatus according to claim 1, wherein said fore and aft liquid-operated fine control means comprises: a first internally threaded member fixed to one of said supporting stand and said first movable member, a first fine control screw shaft screwed into the threads of said first internally threaded member, and a fore and aft fine control handle fixed to an end of said first fine control screw shaft; said first piston of said fore and aft liquid-operated fine control means is fixed at an opposite end of said first fine control screw shaft; and said first piston slides in said first liquid-operated cylinder by rotating said fore and aft fine control handle; and wherein:

said left and right liquid-operated fine control means comprises: a second internally threaded member fixed to one of said supporting stand and said second movable member, a second fine control screw shaft screwed into the threads of said second internally threaded member, and a left and right fine control handle fixed to an end of said second fine control screw shaft;

said second piston of said left and right liquid-operated fine control means is fixed at an opposite end of said second fine control screw shaft; and said second piston slides in said second liquid-operated cylinder by rotating said left and right fine control handle.

3. A micromanipulator fine control apparatus according to claim 1, wherein said horizontal movement operating means includes a vertical liquid-operated fine control means for vertically movable said micromanipulator comprising: a third liquid-operated cylinder coupled to a vertical liquid-operated fine control cylinder of said micromanipulator by a third hose, a third internally threaded member, a third fine control screw shaft screwed into said third internally threaded member, a vertical fine control handle fixed to an end of said third fine control screw shaft, and a third piston movably fitted to said third liquid-operated cylinder and fixed to an opposite end of said third fine control screw shaft; and said third piston slides in said third liquid-operated cylinder by rotating said vertical fine control handle.

* * * * *